United States Patent
Kobayashi

(10) Patent No.: US 6,394,790 B1
(45) Date of Patent: May 28, 2002

(54) METHOD FOR DEEPLY STAGED COMBUSTION

(75) Inventor: Hisashi Kobayashi, Putnam Valley, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 08/649,090

(22) Filed: May 13, 1996

Related U.S. Application Data

(63) Continuation of application No. 08/153,505, filed on Nov. 17, 1993, now abandoned.

(51) Int. Cl.[7] .................................................. F23M 3/04
(52) U.S. Cl. .................... 431/10; 431/187; 431/190; 431/351
(58) Field of Search .................... 431/10, 190, 351, 431/187

(56) References Cited

U.S. PATENT DOCUMENTS

| | | | |
|---|---|---|---|
| 4,531,960 A | 7/1985 | Desprez ........................ | 65/134 |
| 4,541,796 A | 9/1985 | Anderson ..................... | 431/187 |
| 4,629,413 A | * 12/1986 | Michelson et al. ........... | 431/10 |
| 4,642,047 A | * 2/1987 | Gitman ........................ | 431/10 |
| 4,842,509 A | * 6/1989 | Hasenack ..................... | 431/10 |
| 4,863,371 A | 9/1989 | Ho ................................ | 431/9 |
| 4,878,829 A | 11/1989 | Anderson ..................... | 431/8 |
| 4,907,961 A | 3/1990 | Anderson ..................... | 431/8 |
| 4,946,382 A | 8/1990 | Kobayashi et al. ........... | 431/8 |
| 4,969,814 A | 11/1990 | Ho et al. ...................... | 431/8 |
| 4,988,285 A | 1/1991 | Delano ......................... | 431/5 |
| 5,076,779 A | 12/1991 | Kobayashi .................... | 431/5 |
| 5,116,399 A | 5/1992 | Lauwers ....................... | 65/135 |
| 5,203,859 A | 4/1993 | Khinkis et al. ............... | 432/30 |
| 5,242,296 A | 9/1993 | Tuson et al. .................. | 431/10 |
| 5,308,239 A | * 5/1994 | Bazarian et al. .............. | 431/10 |
| 5,431,559 A | 7/1995 | Taylor .......................... | 431/164 |
| 5,439,373 A | * 8/1995 | Anderson et al. ............. | 431/10 |

FOREIGN PATENT DOCUMENTS

| | | |
|---|---|---|
| DE | 4142401 | 6/1993 |
| EP | 0187441 | 7/1986 |
| EP | 0127513 | 7/1987 |
| EP | 0451648 | 10/1991 |
| EP | 0507995 | 10/1992 |
| WO | WO9110864 | 7/1991 |

OTHER PUBLICATIONS

"Oxygen Enriched Air/Natural Gas Burner System Development", Final Report, Gas Research Institute (1989), pp. 140 and 186–189.

Michelfelder, S. et al., "Transfert de chaleur et pollution", Revue Générale de Thermique, No. 196 (Apr. 1978) p. 324 (with translation).

Baukal, C.E. et al., "$NO_x$ Measurements in Oxygen–Enriched, Air–Natural Gas Combustion Systems", Fossil Fuel Combustion Symposium (Amer. Soc. Mech. Eng, 1990), pp. 75–79.

Baukal, C.E. et al., "Oxygen Enrichment Enhances Combustion", Air Products and Chemicals, Inc., (before 1992), pp. 17–23.

Panahi, S.K. et al., "Low–$NO_x$ Technologies for Natural Gas–Fired Regenerative Glass Melters", presented at The Scandinavian Society of Glass Technology, Institute of Gas Technology (1992), pp. 1–15.

\* cited by examiner

*Primary Examiner*—James C. Yeung
(74) *Attorney, Agent, or Firm*—Donald T. Black

(57) ABSTRACT

A combustion method for carrying out combustion with reduced generation of NOx wherein high velocity fuel and oxidant in a very low substoichiometric ratio are combusted and thereafter secondary oxidant mixes and combusts with the resulting combustion reaction products.

10 Claims, 3 Drawing Sheets

METHOD FOR DEEPLY STAGED COMBUSTION

This application is a continuation of prior U.S. application: Ser. No. 08/153,505 filing date Nov. 17, 1993 now abandoned.

TECHNICAL FIELD

This invention relates generally to combustion and is particularly useful for carrying out combustion with reduced generation of nitrogen oxides.

BACKGROUND ART

Nitrogen oxides (NOx) are a significant pollutant generated during combustion and it is desirable to reduce their generation in carrying out combustion. It is known that combustion may be carried out with reduced NOx generation by using technically pure oxygen or oxygen-enriched air as the oxidant as this reduces the amount of nitrogen provided to the combustion reaction on an equivalent oxygen basis. However the use of an oxidant having a higher oxygen concentration causes the combustion reaction to run at a higher temperature and this higher temperature kinetically favors the formation of NOx.

Accordingly, it is an object of this invention to provide a method for carrying out combustion, which may be practiced using an oxidant having a higher oxygen concentration than that of air, while achieving reduced generation of nitrogen oxides.

SUMMARY OF THE INVENTION

The above and other objects, which will become apparent to one skilled in the art upon a reading of this disclosure, are attained by the present invention which is:

A method for carrying out combustion while achieving reduced generation of nitrogen oxides comprising:

(A) injecting primary fuel and primary oxidant into a combustion zone in a ratio within the range of from 5 to 50 percent of stoichiometric, said primary oxidant being a fluid having an oxygen concentration of at least 30 volume percent;

(B) injecting secondary oxidant into the combustion zone at a point spaced from where said primary fuel and primary oxidant are injected into the combustion zone;

(C) combusting primary fuel and primary oxidant within the combustion zone separate from the secondary oxidant to produce combustion reaction products; and (D) mixing secondary oxidant with combustion reaction products within the combustion zone and thereafter combusting secondary oxidant with combustion reaction products.

As used herein the terms "nitrogen oxides" and "NOx" mean one or more of nitrous oxide ($N_2O$), nitric oxide (NO), nitrogen trioxide ($N_2O_3$), dinitrogen tetroxide ($N_2O_4$), nitrogen dioxide ($NO_2$), trinitrogen tetroxide ($N_3O_4$) and nitrogen trioxide ($NO_3$).

As used herein the term "products of complete combustion" means one or more of carbon dioxide and water vapor.

As used herein the term "products of incomplete combustion" means one or more of carbon monoxide, hydrogen, carbon and partially combusted hydrocarbons.

As used herein the term "unburned fuel" means fuel which has undergone no combustion and/or products of incomplete combustion.

DETAILED DESCRIPTION

The invention will be described in detail with reference to the Drawings.

Figure 1:
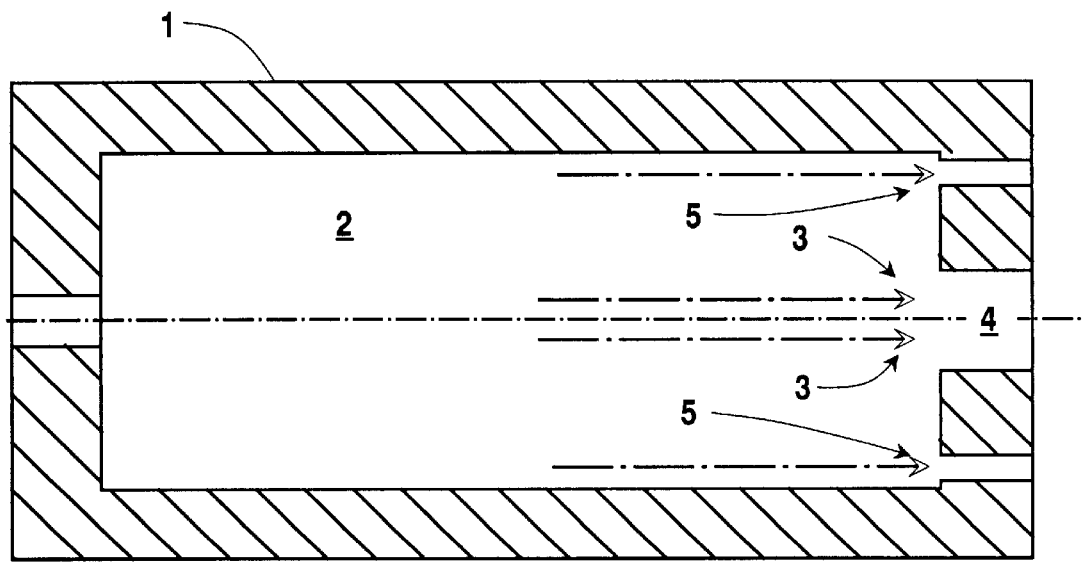
FIG. 1 is a simplified cross-sectional view of one embodiment for carrying out the method of this invention.
Figure 2:
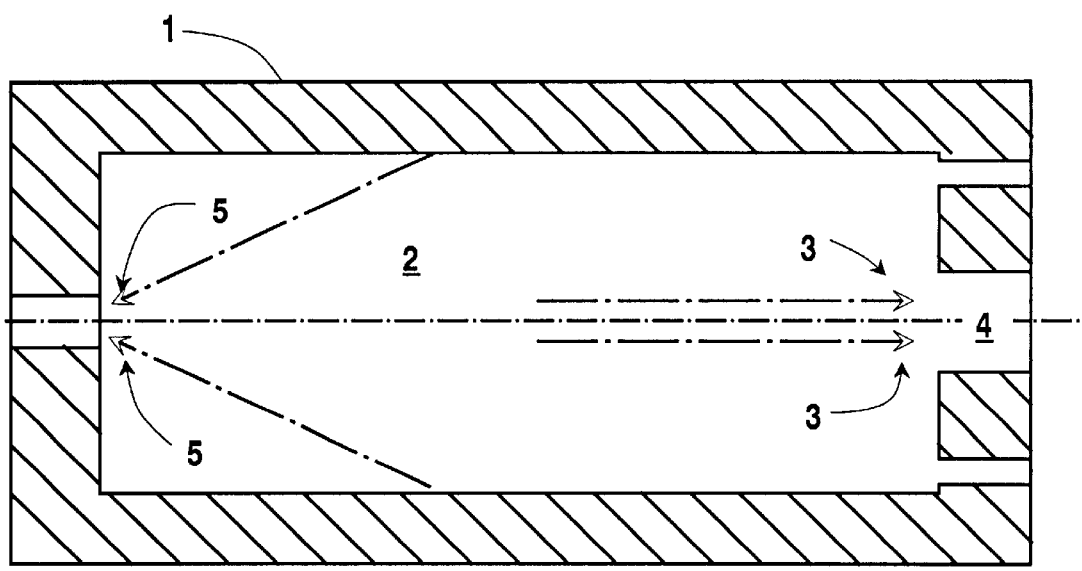
FIG. 2 is a simplified cross-sectional view of another embodiment for carrying out the method of this invention.

Referring now to FIGS. 1 and 2, furnace 1 defines furnace zone or combustion zone 2. The furnace may be any suitable industrial furnace such as, for example, a glassmaking furnace, a steelmaking furnace, an aluminum melting furnace, a cement kiln or an incinerator.

Primary fuel and primary oxidant 3 is injected into combustion zone 2 through injection port 4 which in this case also serves as the exhaust port. The primary fuel and oxidant is injected using appropriate burners or lances which are not illustrated. A burner is a device which provides both fuel and oxidant into a combustion zone and a lance is a device which injects only one of fuel and oxidant into a combustion zone. The primary fuel and oxidant may be injected together in a premixed condition into combustion zone 2 or may be injected separately into combustion zone 2 and thereafter mix within combustion zone 2 to form the primary fuel and oxidant mixture 3 within combustion zone 2. The primary fuel and oxidant may be injected into combustion zone 2 in a single stream or jet or in a plurality of streams or jets.

The primary fuel may be any gas or other fuel which contains combustibles which may combust in the combustion zone. Among such fuels one can name natural gas, coke oven gas, propane, methane, oil and pulverized coal.

The primary oxidant is a fluid having an oxygen concentration of at least 30 volume percent oxygen, preferably at least 90 volume percent oxygen. The primary oxidant may be technically pure oxygen having an oxygen concentration of 99.5 percent or more.

The primary fuel and oxidant are provided into combustion zone 2 at flowrates such that the ratio of primary oxygen to primary fuel is within the range of from 5 to 50 percent, preferably within the range of from 10 to 30 percent of stoichiometric. The stoichiometric amount of primary oxygen is the amount of primary oxygen required to completely combust the primary fuel injected into combustion zone 2.

The primary fuel is injected into combustion zone 2 generally at a high velocity of at least 50 feet per second, preferably exceeding 100 feet per second and most preferably within the range of from 300 to 1000 feet per second. When the primary fuel and oxidant are injected premixed into the combustion zone, the mixture is injected at the velocity described above for the fuel. When the primary fuel and oxidant are injected without premixing into the combustion zone, the primary oxidant will generally have a velocity less than that of the primary fuel. Preferably in such a case the velocity of this primary injected oxidant will be within the range of from 20 to 50 feet per second.

The primary fuel and oxidant combust within combustion zone 2 to produce combustion reaction products. Combustion reaction products may include products of complete combustion but, owing to the defined substoichiometric oxygen to fuel ratio, will include unburned fuel. The incomplete combustion of the primary fuel with the primary oxidant, coupled with the high velocity of the primary fuel which promotes mixing of products of complete combustion in zone 2 with the primary fuel jet or jets, enables the combustion of primary fuel and oxidant to proceed at a lower temperature than would otherwise be the case, thus reducing the tendency of NOx to form.

There is also injected into the combustion zone at a point spaced from where the primary fuel and oxidant are injected into the combustion zone one or more streams of secondary oxidant. The secondary oxidant may be any fluid containing oxygen for combustion with combustion reaction products. Preferably the secondary oxidant is a fluid which has a lower concentration of oxygen than does the primary oxidant as this works toward finishing the combustion within the combustion zone without creating a high flame temperature. Preferably the secondary oxidant is air or a fluid mixture of oxygen and recirculated flue gas.

Preferably the secondary oxidant is injected at a velocity greater than 50 feet per second, most preferably at a velocity within the range of from 200 to 1000 feet per second, which further promotes mixing and combustion with products of complete combustion within the combustion zone. At such high velocities products of complete combustion are entrained into the oxidant stream thus diluting the secondary oxidant stream prior to the combustion of the secondary oxidant with the unburned fuel. This reduces the combustion reaction temperature and contributes to the lower formation of NOx.

FIG. 1 illustrates the injection of two secondary oxidant jets 5 parallel with the primary fuel and oxidant, i.e. from the same furnace end wall as the primary fuel and oxidant, and FIG. 2 illustrates the injection of two secondary oxidant jets 5 opposite from the primary fuel and oxidant, i.e. from the opposite furnace end wall as the primary fuel and oxidant. The secondary oxidant is injected from one or more injection ports using one or more lances which are not illustrated in the Drawings.

Within combustion zone 2 the secondary oxidant mixes with combustion reaction products, which resulted from the combustion of the primary fuel and oxidant, and combusts with the unburned fuel of the combustion reaction products. Preferably the unburned fuel is completely combusted with the secondary oxidant within the combustion zone.

The combustion within the combustion zone serves to generate heat which may be used for heating, melting, drying or other purposes. The resulting gases are exhausted from the combustion zone after the combustion.

Figure 3:
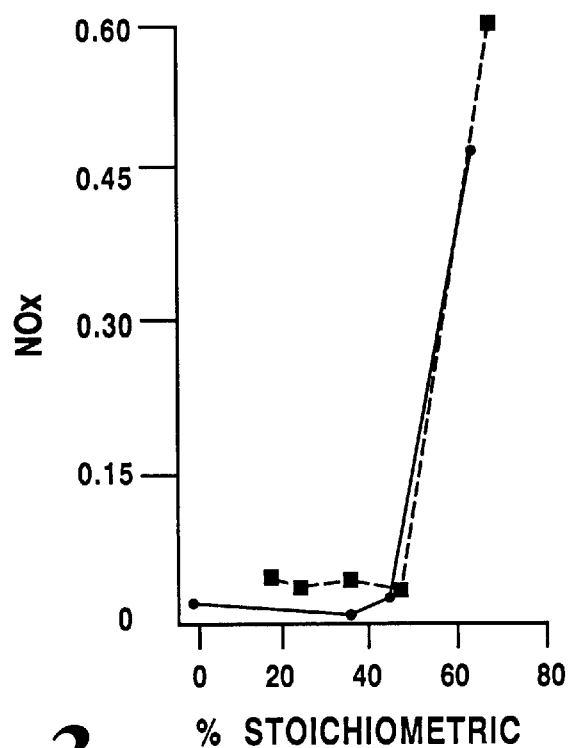
FIG. 3 is a graphical representation illustrating the importance of the defined oxygen to fuel ratio of the primary fuel and oxidant in the practice of this invention.
Figure 4:
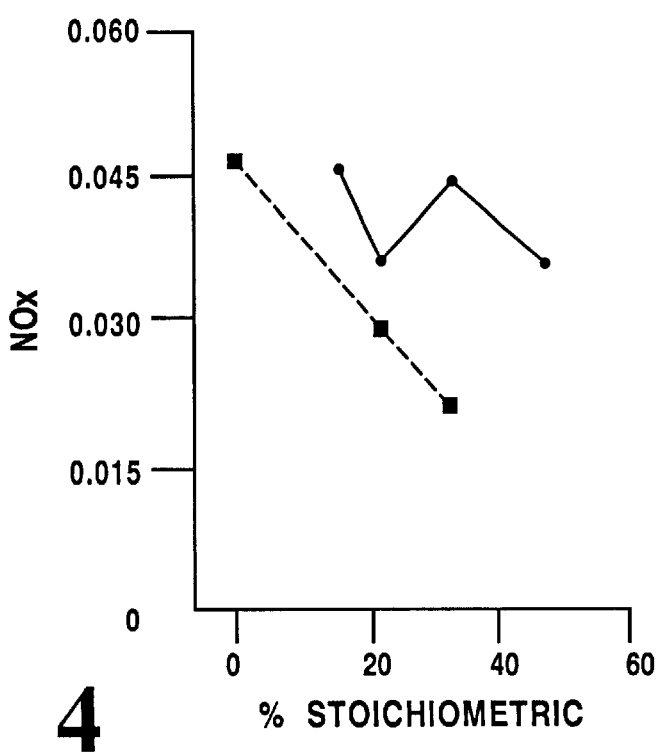
FIG. 4 is a graphical representation illustrating the improved results attained with the preferred primary fuel velocity in the practice of this invention.
Figure 5:
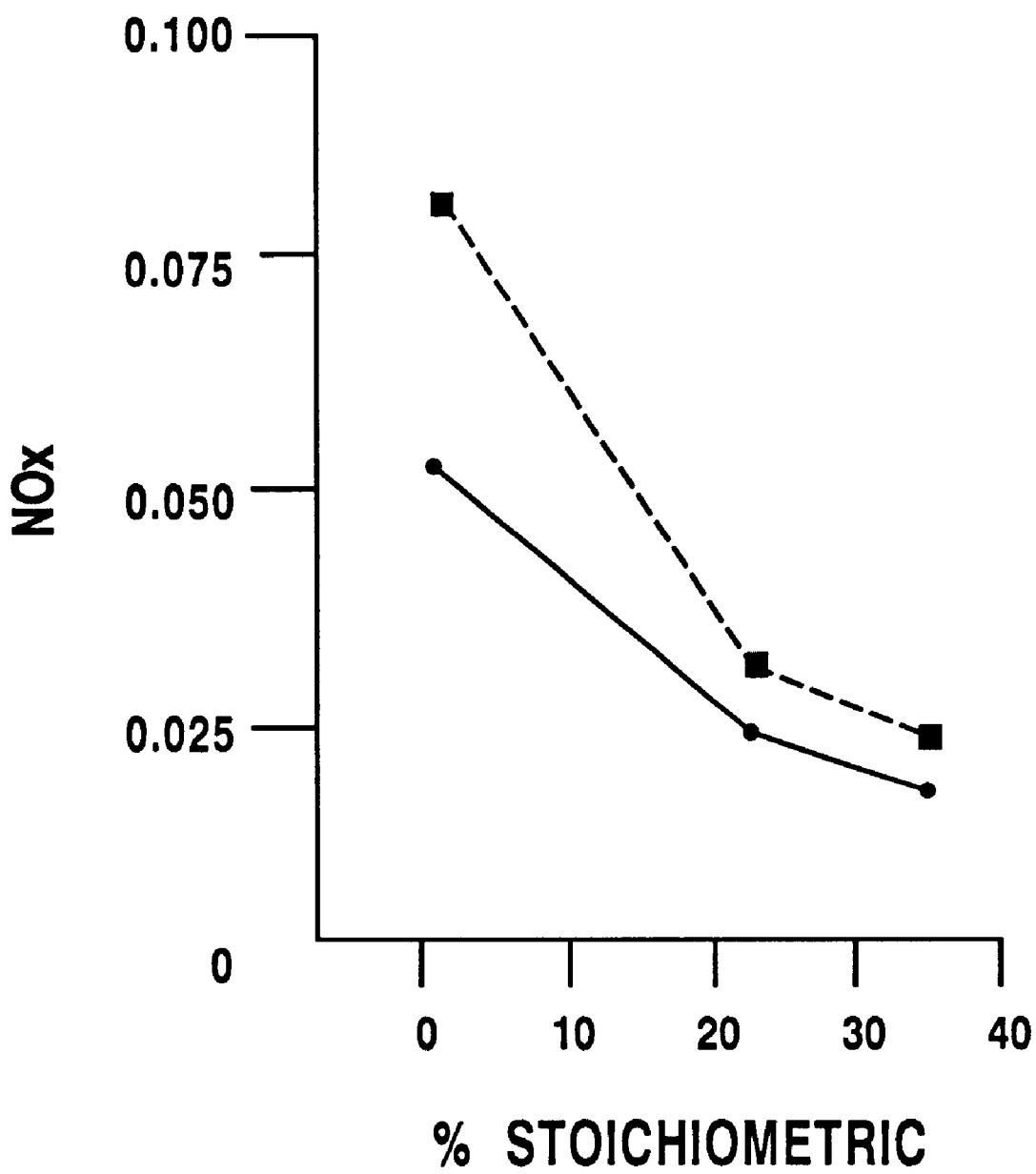
FIG. 5 is a graphical representation illustrating improved results attained with the preferred secondary oxidant velocity in the practice of this invention.

The advantageous results of the method of this invention are illustrated in FIGS. 3, 4 and 5. In FIGS. 3, 4 and 5 the NOx generated in pounds of $NO_2$ per million BTU is shown on the vertical axis and the ratio of primary oxidant to fuel as a percentage of stoichiometric is shown on the horizontal axis. In the examples which are reported in FIGS. 3, 4 and 5 the primary fuel was natural gas and the primary and secondary oxidant were both commercial oxygen having an oxygen concentration greater than 99.5 percent. The primary fuel and primary oxidant were premixed prior to their injection into the combustion zone. The internal dimensions of the combustion zone were three feet in diameter and 8 feet in length.

Referring now to FIG. 3, the circular data points refer to parallel injection practice similar to that illustrated in FIG. 1, and the square data points refer to opposite injection practice similar to that illustrated in FIG. 2. As can be seen from FIG. 3, as the ratio of primary oxygen to fuel exceeds about 50 percent of stoichiometric, there is experienced a sharp increase in the generation of NOx, thus demonstrating the criticality of the defined upper limit of this ratio in the practice of this invention.

FIG. 4 shows the results of parallel injection practice similar to that illustrated in FIG. 1 with high fuel velocity and low fuel velocity. The circular data points show the results obtained with low primary fuel and oxidant mixture velocity, reading from left to right 129, 143, 164 and 189 feet per second respectively. The square data points show the results obtained with high primary fuel and oxidant mixture velocity, reading from left to right 392, 575 and 652 feet per second respectively. As can be seen from FIG. 4, the high primary fuel and oxidant mixture velocity employed in the preferred practice of this invention enables the attainment of lower levels of NOx generation.

FIG. 5 shows the results of parallel injection practice similar to that illustrated in FIG. 1 with high secondary oxidant velocity and with low secondary oxidant velocity. For each of the square and circular data points the primary fuel and oxidant mixture velocity, reading from left to right, was 392, 575 and 652 feet per second respectively. The circular data points show the results obtained with secondary oxidant velocities, reading from left to right, of 1004, 718 and 611 feet per second respectively. The square data points show the results obtained with secondary oxidant velocities, reading from left to right, of 133, 99 and 79 feet per second respectively. As can be seen from FIG. 5, the high secondary oxidant velocity employed in the preferred practice of this invention enables the attainment of lower levels of $NO_x$ generation.

While not wishing to be held to any theory, applicant believes that the reason the surprisingly low stoichiometric ratio of primary oxidant to fuel is advantageous is because of the combined effects of the flame temperature and the nitrogen compounds formed under the fuel-rich conditions. Under fuel-rich conditions HCN and $NH_3$, not $NO_x$, become the dominant nitrogenous species generated by the combustion. These compounds are later oxidized to form $NO_x$ in the subsequent combustion. Thus, it is necessary to minimize the concentration of these compounds in the primary flame. Especially with an oxidant having an oxygen concentration which exceeds that of air so that the flame temperature remains high, under the slower kinetics characteristic of fuel-rich conditions, the lowest generation of HCN and $NH_3$ in the primary flame is achieved under lower stoichiometric conditions than in conventional staged combustion practice with air as the oxidant.

Although the invention has been described in detail with reference to certain specific embodiments, those skilled in the art will recognize that there are other embodiments of the invention within the spirit and the scope of the claims.

What is claimed is:

1. A method for carrying out combustion while achieving reduced generation of nitrogen oxides comprising:

(A) injecting primary fuel and primary oxidant into a combustion zone in a ratio within the range of from 5 to 50 percent of stoichiometric, said primary oxidant being a fluid having an oxygen concentration of at least 30 volume percent;

(B) injecting secondary oxidant into the combustion zone at a point spaced from where said primary fuel and primary oxidant are injected into the combustion zone;

(C) combusting primary oxidant and primary fuel mixed with products of complete combustion within the combustion zone separate from the secondary oxidant to produce combustion reaction products;

(D) mixing secondary oxidant with combustion reaction products within the combustion zone and thereafter combusting secondary oxidant with combustion reaction products; and wherein said primary fuel is injected at a velocity sufficient to promote mixing with products of complete combustion in the combustion zone such that the temperature of combustion is lowered.

2. The method of claim 1 wherein the secondary oxidant is injected into the combustion zone from the same side of the combustion zone as that from which the primary fuel and primary oxidant are injected.

3. The method of claim 1 wherein the secondary oxidant is injected into the combustion zone from the opposite side of the combustion zone as that from which the primary fuel and primary oxidant are injected.

4. The method of claim 1 wherein the primary fuel and primary oxidant are injected together as a mixture into the combustion zone.

5. The method of claim 1 wherein the primary fuel and primary oxidant are injected separately into the combustion zone.

6. The method of claim 1 wherein the secondary oxidant has an oxygen concentration which is less than the oxygen concentration of the primary oxidant.

7. The method of claim 1 wherein the primary fuel is injected into the combustion zone at a velocity of at least 50 feet per second.

8. The method of claim 1 wherein the secondary oxidant is injected into the combustion zone at a velocity greater than 50 feet per second.

9. The method of claim 1 wherein the secondary oxidant is injected into the combustion zone at a velocity which exceeds the velocity at which the primary fuel is injected into the combustion zone.

10. The method of claim 1 wherein the primary oxidant is a fluid having an oxygen concentration of at least 90 volume percent.

* * * * *